(12) United States Patent
Nelson et al.

(10) Patent No.: US 7,806,485 B1
(45) Date of Patent: Oct. 5, 2010

(54) VEHICLE WHEEL ACCESSORY CAPABLE OF DISPLAYING DIFFERENT DESIGNS

(75) Inventors: Lloyd Nelson, Dallas, TX (US); Jack Rudder, Grand Prairie, TX (US)

(73) Assignee: Three-L Group, Inc, Dallas, TX (US)

( * ) Notice: Subject to any disclaimer, the term of this patent is extended or adjusted under 35 U.S.C. 154(b) by 112 days.

(21) Appl. No.: 12/214,192

(22) Filed: Jun. 17, 2008

(51) Int. Cl.
  *B60B 7/04* (2006.01)
(52) U.S. Cl. .............................. 301/37.25; 301/37.109
(58) Field of Classification Search ............ 301/37.101, 301/37.25, 37.106, 37.108, 37.109
  See application file for complete search history.

(56) References Cited

U.S. PATENT DOCUMENTS

| | | | |
|---|---|---|---|
| 1,487,904 A | 3/1924 | Walters | |
| 4,463,990 A | 8/1984 | Beisch | |
| 4,645,268 A | 2/1987 | Carlson | |
| 5,795,035 A | 8/1998 | Fuller | |
| 6,637,829 B1* | 10/2003 | Jenkins | 301/37.108 |
| 7,055,915 B2* | 6/2006 | Fitzgerald | 301/37.106 |
| 7,472,967 B2* | 1/2009 | DoVale et al. | 301/37.25 |
| 7,618,099 B1* | 11/2009 | Acosta | 301/37.372 |
| 2006/0238017 A1* | 10/2006 | Samson et al. | 301/37.101 |
| 2008/0036285 A1* | 2/2008 | Davis et al. | 301/37.25 |

* cited by examiner

*Primary Examiner*—Jason R Bellinger
(74) *Attorney, Agent, or Firm*—Robert Nathans

(57) ABSTRACT

A vehicle wheel accessory includes a hub, a plurality of blades having ornamental designs on opposite surfaces thereof, a plurality of radially extending spokes, coupled to said hub by a hinged spoke coupler; a biasing device contained within each blade for biasing the blade toward said hub and yet permitting said blade to be pulled outwardly away from said hub, enabling each blade to be rotated about an associated spoke for causing a first design on a first side of a blade to be displaced by a second design on a second opposite side of said blade; and wherein a plurality of anti-rotation locking devices are coupled to said hub for preventing blade rotation when lower portions of associated blades remain seated therein.

17 Claims, 4 Drawing Sheets

VEHICLE WHEEL ACCESSORY CAPABLE OF DISPLAYING DIFFERENT DESIGNS

BACKGROUND OF THE INVENTION

The present invention relates to the field of vehicle wheel ornamentation.

U.S. patent to Fuller, U.S. Pat. No. 5,795,035 describes numerous known approaches to modify the appearance of a vehicle wheel to enhance the attractiveness of the wheel.

Carlson U.S. Pat. No. 4,645,268 discloses intertwined blade or spoke-like elements for enhancing the appearance of a vehicle rim. The second upper cast metal cover changes the appearance of the wheel when it is attached or detached from the lower spoke-like disk.

Beisch U.S. Pat. No. 4,463,990 discloses adding radially extending spokes to an inner wheel hub attachment to simulate a wire wheel sports car look.

Walters U.S. Pat. No. 1,487,904 teaches mounting ornaments 20 "of any desired configuration" between wheel spokes 10.

Fowlkes U.S. Pat. No. 6,554,370 discloses a wheel spinner assembly independently rotatable relative to a corresponding wheel.

SUMMARY OF A PRESENTLY PREFERRED EMBODIMENT OF THE INVENTION

A vehicle wheel accessory includes a hub, a plurality of blades or vanes having ornamental designs on opposite surfaces thereof, a plurality of radially extending spokes, coupled to the hub via a hinged spoke coupler; a biasing device contained within each blade for biasing the blade toward said hub and yet permitting the blade to be pulled outwardly away from the hub, enabling each blade to be quickly and easily rotated about an associated spoke for causing a first design on a first side of a blade to be displaced by a second design on a second opposite side of the blade; and wherein a plurality of anti-rotation locking devices are coupled to the hub for preventing blade rotation when lower portions of associated blades remain seated therein.

The wheel accessory can be directly affixed to a vehicle wheel or can be coupled to an intermediate member such as a bearing assembly allowing the wheel accessory to rotate independently relative to a corresponding wheel as disclosed in Fowlkes U.S. Pat. No. 6,554,370.

The wheel accessory enables vehicle accessory designs to be quickly and easily changed in a couple of minutes without changing to another accessory.

DETAILED DESCRIPTION OF PREFERRED EMBODIMENTS OF THE INVENTION

The "flipper" vehicle wheel accessory itself, including hub 9, may connect to a prior art coupling device on a vehicle rim which will allow the accessory to spin freely of the traditional rim behind it as mentioned previously. Alternatively, it may be directly rigidly connected to a conventional vehicle hub somewhat like a spare tire assembly is bolted to an automobile.

Figure 1A:
FIG. 1A illustrates a prior art automotive wheel rim 15.
Figure 1B:
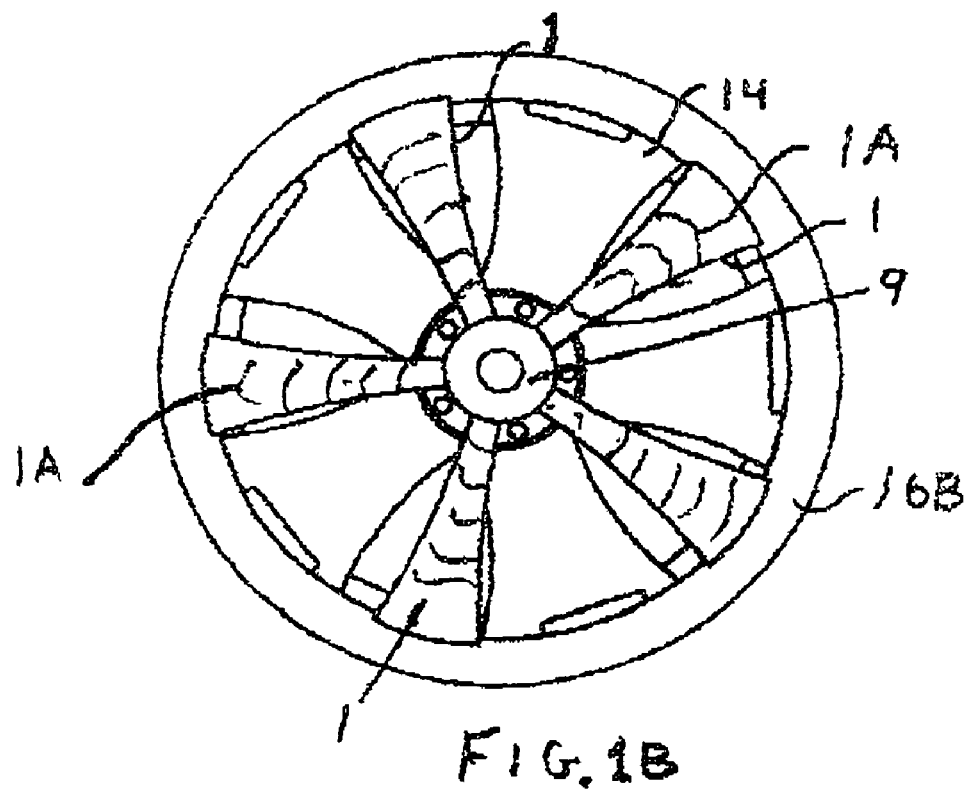
FIG. 1B illustrates an overall exemplary version of a "flipper" vehicle wheel accessory having five rotatable "flipper" blades along with five non-rotatable blades affixed to front rim portion 16B of FIG. 1A, 16A being a rear rim portion.

The overall configuration of a "flipper" vehicle wheel accessory is indicated in FIG. 1B. A hub 9 of the accessory supports a plurality of decorative blades 1 that have various designs or surface textures, shapes or finished styles upon front and back surfaces such as satin surfaces, grooved surfaces or other geometric designs that can even have various colors. Each blade 1 is coupled to hub 9 in a manner to enable the blade to turn over, or be flipped over 180 degrees, thus permitting the design on the blade back to be now visible in place of the previously visible design on the blade before being turned over 180 degrees. The blades 1 of course rotate along with the hub somewhat in the manner of a windmill. Optionally, additional blades 14 could be affixed to rim 16B of FIG. 1A schematically illustrating a conventional automotive wheel rim for having a tire (not shown) mounted thereon. This further enhances the appearance of the wheel assembly.

The main components described are preferably utilized to assemble the wheel assembly. There is only one hub, and there are as many blades/springs/spokes as determined necessary by the design desired; five being typical as shown in FIG. 1.

Figure 2:
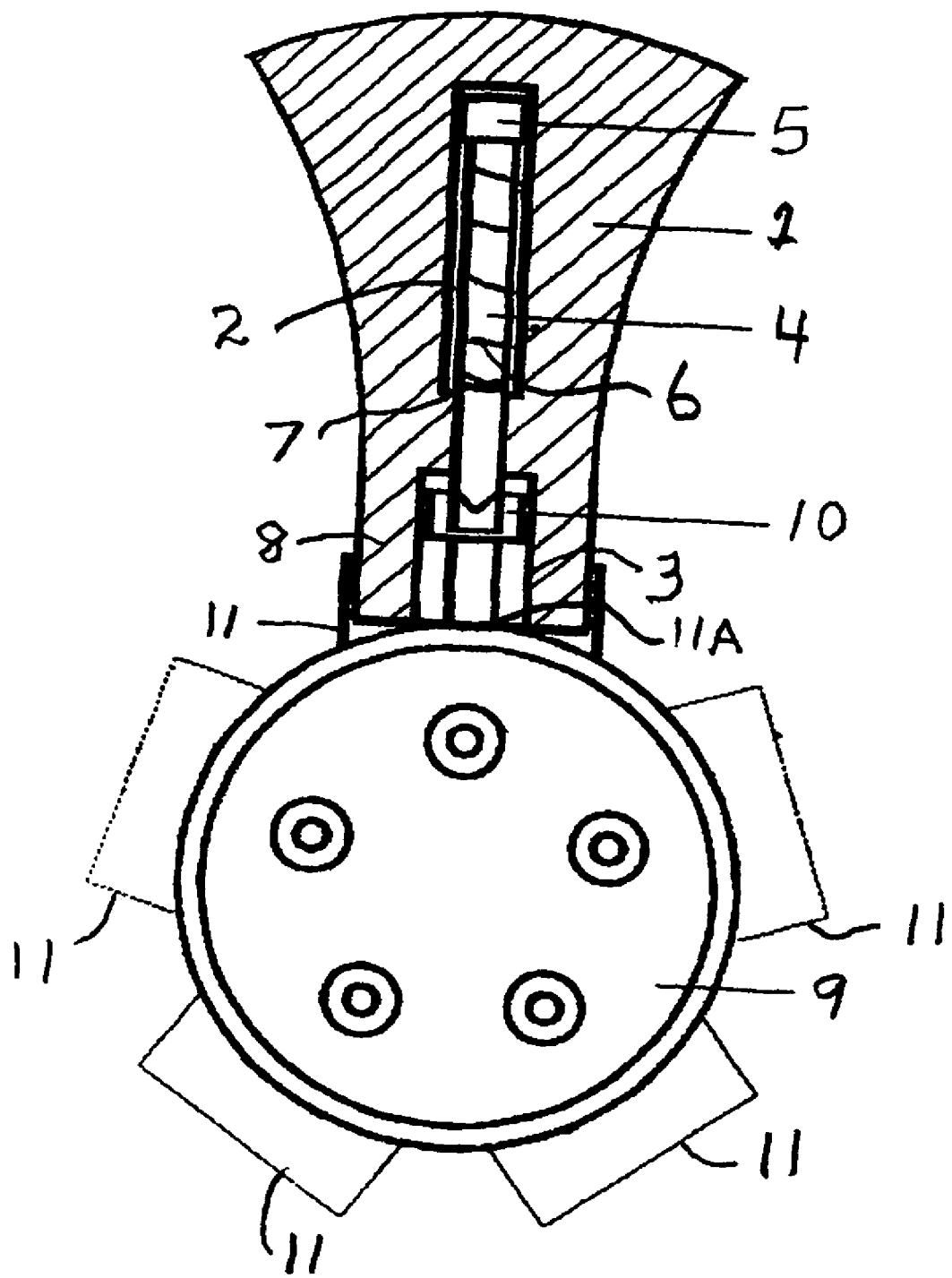
FIG. 2 illustrates in cross-section a single blade in the normal retracted position relative to the central hub.
Figure 3:
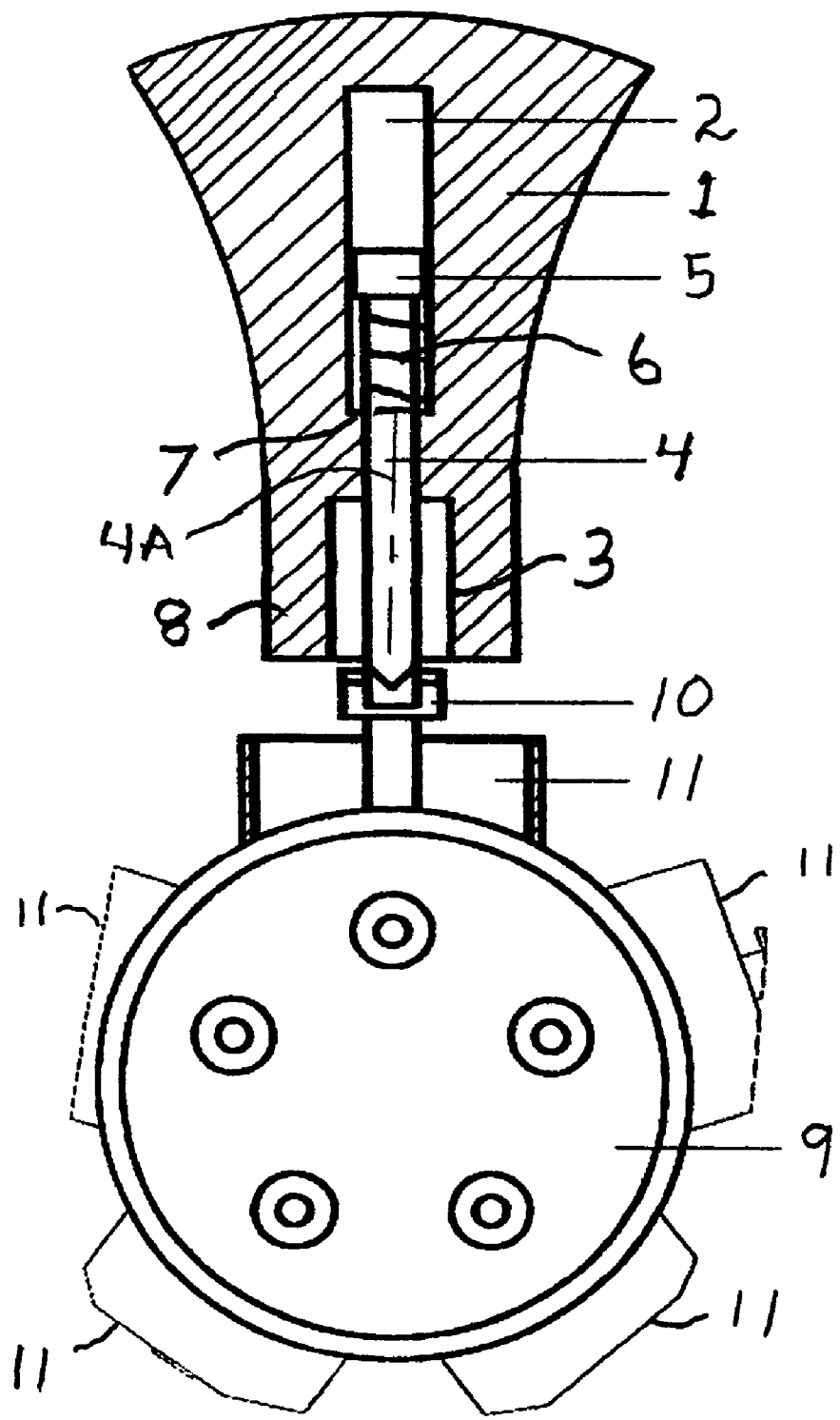
FIG. 3 illustrates in cross-section a single blade in an extended position facilitating design change during 180 degree rotation of the blade about its longitudinal axis.

A single vane or blade 1 shown in FIGS. 2 and 3 comprises the wide, flat portions of the wheel accessory which may be rotated 180 degrees as mentioned above to change designs. The blade itself is fashioned with an upper internal cavity 2 and a lower internal cavity 3. The cavities contain a cylindrical spoke shaft 4. When the blade is in a closed or retracted position, shown in FIG. 2, the lower cavity 3 will encompass a hinge 10 where the spoke shaft connects to the hub 9 at portion 11A, e.g. by welding. See also FIG. 4 further illustrating the hinge and blade.

As shown in FIG. 2, the blade's rectangular base 8 fits into a rectangular receptacle 11 affixed to central hub 9, e.g. by welding, which receptacle 11 contains the hinge 10 to which the spoke shaft 4 connects as shown in FIG. 2. The two external, visible, large surfaces of blade 1, on opposite sides of the blade, would typically carry two different designs that can consist of different colors, finishes, metals, and other possible ornamental designs. These designs are indicated by wavy lines 1A in FIG. 1B. Alternatively, commercially available ornamental stickers bearing colorful ornamental designs may be adhered to opposite sides of the blade surfaces. For example the blades could have all green designs for St. Patrick's Day or the blades could be colored red, white and blue for the Fourth of July.

Figure 4:
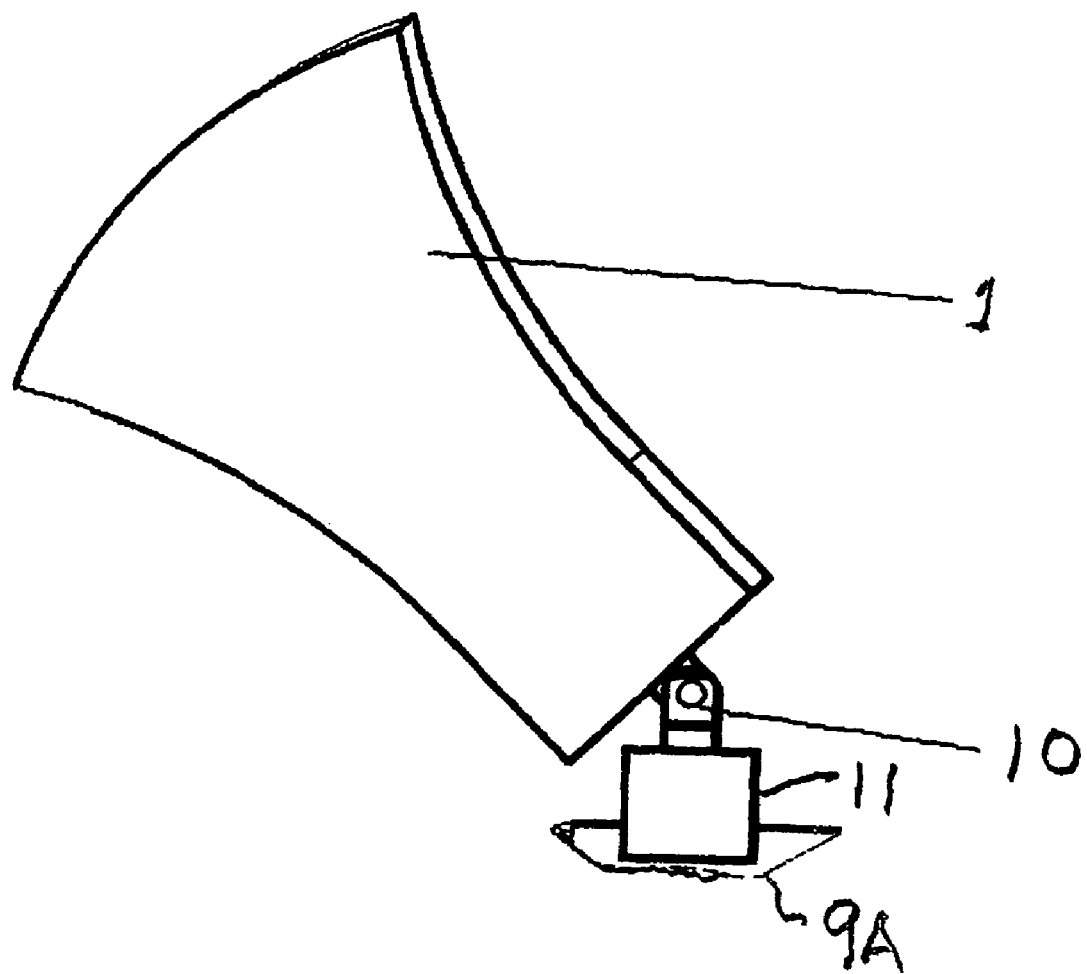
FIG. 4 illustrates a side view of the hinge coupler to be described below along with blade 1 being partially rotated about the longitudinal axis of a spoke interior of the blade.

As shown in FIGS. 2 and 3, spring 6 can be a standard helical spring which preferably is stiff enough to hold the blade to the hub even while the wheel assembly is rotating or spinning, but compliant enough to be contracted or compressed while a person or device pulls the blade 1 outward in a radial direction away from the hub. The spring 6 fits around cylindrical spoke shaft 4 just below its cylindrical spoke head 5. The spring rests upon an internal lip 7 in the blade. When the blade is pulled outward radially, the spring contracts and is compressed between the spoke head, and the internal lip 7 inside of the blade, as shown in FIG. 3, mechanically biasing the blade inwardly toward hub 9 and hub portion 9A as shown in FIG. 4.

As mentioned above, the accessory enables the user to switch which design is visible on its flipper blades. To do this, the user pulls up on the blade to a position above the hub's rectangular receptacle 11 and above the hinge 10 between the spoke and hub portion 9A as shown in FIG. 4. This also contracts the spring putting it in compression. Once the hinge is uncovered, the user can bend the blade towards him or her about its hinge at an angle of typically 30-45 degrees as shown in FIG. 4, and then rotate the blade 180 degrees about its longitudinal axis 4a extending down the middle of the spoke shaft. In doing this, the user changes the visible view. If Design A was on the front visible side of the blade before the user turned it, and Design B was on the back side, rotating the blade 180 degrees would place Design B on the front, visible side, and Design A on the back, hidden side of the blade.

After rotating the blade, the user tips the blade back into its position shown in FIG. 3 about its hinge 10. Then the user allows the blade to slide into the hub's rectangular receptacles as shown in FIG. 2 by virtue of the expansion and biasing effect of spring 6 and be effectively in place once again upon the hub but with the alternate design visible. Thus, spring 6 aids in maintaining seating of lower blade portion 8 within receptacle 11. If the lower blade portion is shaped as a rectangular or square or as another shape e.g. as a hexagon etc., then the container 11 will be similarly shaped as a rectangle or square or hexagon.

The blades and other components may be made of metal or injection molded plastic.

The wheel accessory can also be utilized in vehicles other than automotive vehicles such as bicycles, carts or a wheelchair. For example if an embodiment of the invention were to be utilized on a slow speed vehicle such as a toy vehicle or a wheelchair, the hinge providing outward tipping of the blade as indicated in FIGS. 4 and 5 could be eliminated and the blade could be flipped over 180 degrees in the outward position shown in FIG. 3 and returned to the inward position shown in FIG. 2.

The wheel accessory can be directly affixed to a vehicle wheel or can be coupled to an intermediate member such as a bearing assembly allowing the wheel accessory to rotate independently relative to a corresponding wheel as disclosed in Fowlkes U.S. Pat. No. 6,554,370.

Known anti-theft devices known in the art may be utilized; e.g. D'Angelo U.S. Pat. No. 4,061,400.

What is claimed is:

1. A vehicle wheel accessory that may be coupled to a vehicle wheel comprising:
   (a) a hub;
   (b) a plurality of blades having different designs on separate sides of said blades;
   (c) a plurality of radially extending spokes, each spoke being contained within a blade and each spoke being coupled to said hub;
   (d) a mechanical biasing device coupled to each blade for biasing said blade in a radial direction inwardly toward said hub and yet permitting said blade to be pulled outwardly in a radial direction away from said hub, enabling said blade to be rotated about an associated spoke for causing a first design on a first side of a blade to be displaced by a second design on a second side of said blade.

2. The accessory of claim 1 wherein a plurality of anti-rotation locking devices are coupled to said hub for preventing blade rotation when lower portions of said plurality of blades remain seated within said anti-rotation locking devices.

3. The accessory of claim 2 wherein each anti-rotation locking device comprises a shaped container for encompassing a complimentarily shaped lower portion of said blade for preventing rotation of said blade.

4. The accessory of claim 3 wherein each anti-rotation locking device comprises a rectangular container for encompassing a lower rectangular portion of said blade for preventing rotation of said blade.

5. The accessory of claim 1 wherein said mechanical biasing device comprises a spring contained within said blade and positioned about a radially extending spoke, said spring being compliant enough to permit radial displacement of said blade away from said hub in order to rotate said blade about said radially extending spoke.

6. The accessory of claim 2 wherein said mechanical biasing device comprises a spring contained within said blade and positioned about a radially extending spoke, said spring being compliant enough to permit radial displacement of said blade away from said hub in order to rotate said blade about said radially extending spoke.

7. The accessory of claim 3 wherein said mechanical biasing device comprises a spring contained within said blade and positioned about a radially extending spoke, said spring being compliant enough to permit radial displacement of said blade away from said hub in order to rotate said blade about said radially extending spoke.

8. The accessory of claim 4 wherein said mechanical biasing device comprises a spring contained within said blade and positioned about a radially extending spoke, said spring being compliant enough to permit radial displacement of said blade away from said hub in order to rotate said blade about said radially extending spoke.

9. A vehicle wheel accessory that may be coupled to a vehicle wheel comprising:
   (a) a hub;
   (b) a plurality of blades having different designs on separate sides of said blades;
   (c) a plurality of radially extending spokes, each spoke being contained within a blade of said plurality of blades and each spoke being coupled to said hub by a hinged spoke coupler;
   (d) a mechanical biasing device contained within each blade for biasing said blade inwardly toward said hub and yet permitting said blade to be pulled outwardly in a radial direction away from said hub, enabling each blade to be rotated about a spoke of said plurality of spokes for causing a first design on a first side of said blade to be displaced by a second design on a second side of said blade.

10. The accessory of claim 9 wherein a plurality of anti-rotation locking devices are coupled to said hub for preventing blade rotation when lower portions of said blades remain seated within said anti-rotation locking devices.

11. The accessory of claim 10 wherein each anti-rotation locking device comprises a shaped container for encompassing a complimentarily shaped lower portion of said blade.

12. The accessory of claim 11 wherein each anti-rotation locking device comprises a rectangular container for encompassing a lower rectangular portion of said blade.

13. The accessory of claim 9 wherein said mechanical biasing device comprises a spring contained within said blade and positioned about a radially extending spoke, said spring being compliant enough to permit radial displacement of said blade away from said hub in order to rotate said blade about said radially extending spoke.

14. The accessory of claim 10 wherein said mechanical biasing device comprises a spring contained within said blade and positioned about a radially extending spoke, said spring being compliant enough to permit radial displacement of said blade away from said hub in order to rotate said blade about said radially extending spoke.

15. The accessory of claim 11 wherein said mechanical biasing device comprises a spring contained within said blade and positioned about a radially extending spoke, said spring being compliant enough to permit displacement of said blade away from said hub in order to rotate said blade about said radially extending spoke.

16. The accessory of claim 12 wherein said mechanical biasing device comprises a spring contained within said blade and positioned about a radially extending spoke, said spring being compliant enough to permit radial displacement of said blade away from said hub in order to rotate said blade about said radially extending spoke.

17. A method of manipulating a vehicle wheel accessory that may be coupled to a vehicle wheel comprising the steps of
- (a) providing a vehicle wheel accessory including
- (a-1) a hub;
- (a-2) a plurality of blades having different designs on separate sides of said blades;
- (a-3) a plurality of radially extending spokes, each spoke being contained within a blade of said plurality of blades and a hinged spoke coupler for coupling each spoke to said hub;
- (a-4) a mechanical biasing device contained within each blade for biasing said blade radially inwardly toward said hub and yet permitting said blade to be pulled outwardly in a radial direction away from said hub, enabling each blade to be rotated about a spoke of said plurality of spokes for causing a first design on a first side of said blade to be displaced by a second design on a second side of said blade; and
- (a-5) wherein a plurality of anti-rotation locking devices are coupled to said hub for preventing rotation of said blades when lower portions of said blades remain seated within said anti-rotation locking devices;
- (b) pulling a blade in a radial direction away from said hub;
- (c) bending said blade about said hinged spoke coupler from a first angular position to a second angular position;
- (d) rotating said blade about said spoke until said second design is now visible in place of said first design;
- (e) tipping said blade back from said second angular position to said first angular position;
- (f) releasing said blade for permitting the lower portion of said blade to become seated within an anti-rotation device by virtue of said mechanical biasing device; and
- (g) repeating steps (b) through (f) for other blades of said plurality of blades.

* * * * *